United States Patent [19]

Harrison et al.

[11] 4,242,865
[45] Jan. 6, 1981

[54] TURBOJET AFTERBURNER ENGINE WITH TWO-POSITION EXHAUST NOZZLE

[75] Inventors: Emmett S. Harrison, Corona, N.Y.; Anthony Leto, Franklin Lakes, N.J.

[73] Assignee: Curtiss-Wright Corporation, Wood-Ridge, N.J.

[21] Appl. No.: 872,249

[22] Filed: Jan. 25, 1978

[51] Int. Cl.² .................. F02K 1/24; F02K 3/10
[52] U.S. Cl. ................... 60/242; 60/261; 60/271; 239/265.15
[58] Field of Search .......... 60/261, 271, 242, 241; 239/265.15

[56] References Cited

U.S. PATENT DOCUMENTS

| | | | |
|---|---|---|---|
| 2,766,581 | 10/1956 | Welsh | 60/261 |
| 2,880,576 | 4/1959 | Kappus | 60/271 |
| 2,910,828 | 11/1959 | Meyer et al. | 60/261 |
| 3,011,309 | 12/1961 | Carter | 60/242 |
| 3,030,769 | 4/1962 | Badders | 60/242 |
| 3,171,248 | 3/1965 | Ledwith | 60/271 |
| 3,331,204 | 7/1967 | Love | 60/242 |
| 3,386,248 | 6/1968 | Pike et al. | 60/261 |

FOREIGN PATENT DOCUMENTS 1020134  2/1966  United Kingdom ............ 239/265.15

*Primary Examiner*—Douglas Hart
*Attorney, Agent, or Firm*—Arthur L. Frederick

[57] ABSTRACT

A turbojet afterburner engine has an expendable nozzle portion which can be jettisoned when the afterburner is placed in operation.

5 Claims, 2 Drawing Figures

TURBOJET AFTERBURNER ENGINE WITH TWO-POSITION EXHAUST NOZZLE

BACKGROUND OF THE INVENTION

The invention relates to turbojet engines equipped with an afterburner and, more particularly, to such engines for propelling a missile. For this purpose the engine is expendable and therefore a low cost and lightweight engine is of prime importance.

A military aircraft missile generally is launched by a special launching mechanism either from the ground or from an airplane. Turbojet engines have been used to propel such missiles after launch to provide the cruise velocity. In addition, such turbojet engines for missiles have been provided with afterburners to increase the speed of the missile when the target area is approached in order to minimize the possibility of detection and/or interception of the missile. The addition of the afterburner necessitates providing the engine with a variable area exhaust nozzle having at least two positions, one for the non-afterburning mode of operation and one for the afterburning mode of operation.

In the past, such a variable-area-exhaust-nozzle turbojet engine not only required a relatively complex exhaust nozzle but also required a nozzle actuation mechanism for varying the exhaust nozzle area and also required a fuel control system that could be coordinated with the nozzle area. Such a configuration is relatively expensive and heavy and, therefore, is not acceptable for a low cost, expendable turbojet engine for a missile.

SUMMARY OF THE INVENTION

An object of the invention resides in provision of a novel, simple and lightweight turbojet engine for aircraft missiles with an afterburner and having a two-position exhaust nozzle, one position being for non-afterburner operation and the other position being for afterburner operation.

In accordance with the invention, the aircraft missile engine has an afterburner and an exhaust nozzle duct with a nozzle throat portion, and an element is secured within the duct at the nozzle throat for reducing the cross-sectional area of the nozzle throat for non-afterburner operation and means are provided for rendering said element ineffective when the afterburner is activated.

More specifically, in accordance with the invention, the said exhaust nozzle duct has a convergent-divergent profile and said element has a truncated conical profile co-axial with the duct with its reduced diameter end extending downstream from the throat of said convergent-divergent nozzle and in which means are provided for jettisoning said element when the afterburner is activated.

It therefore is a further object of the invention to provide an aircraft missile engine with an afterburner and a convergent-divergent exhaust nozzle together with a jettisonable truncated conical element which is secured to the throat of said nozzle for reducing its cross-sectional area and in which means are provided for jettisoning said element when the engine afterburner is activated.

Other objects of the invention will become apparent upon reading the annexed detail description in connection with the drawings.

DESCRIPTION OF PREFERRED EMBODIMENT

Figure 1:
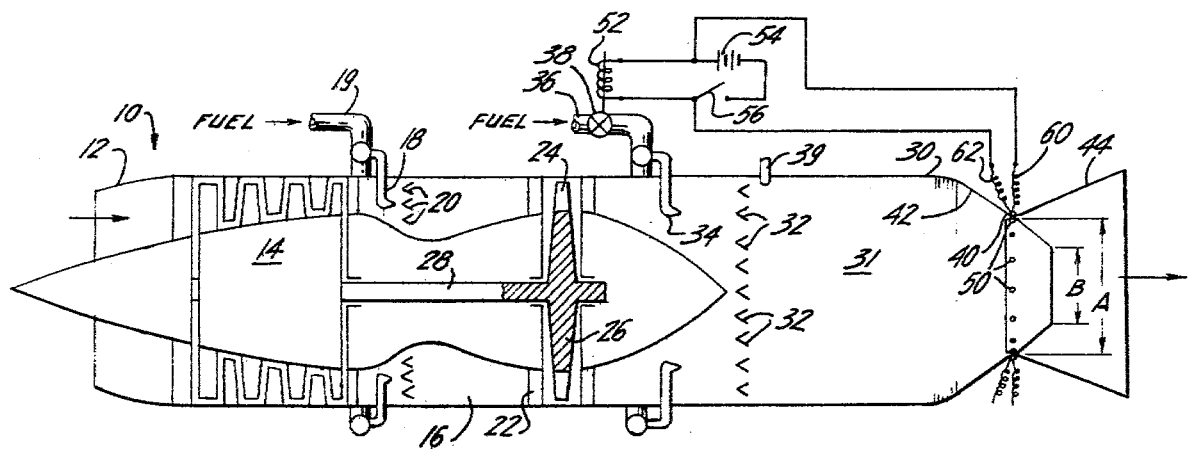
FIG. 1 is a schematic axial sectional view of a turbojet engine embodying the invention.
Figure 2:
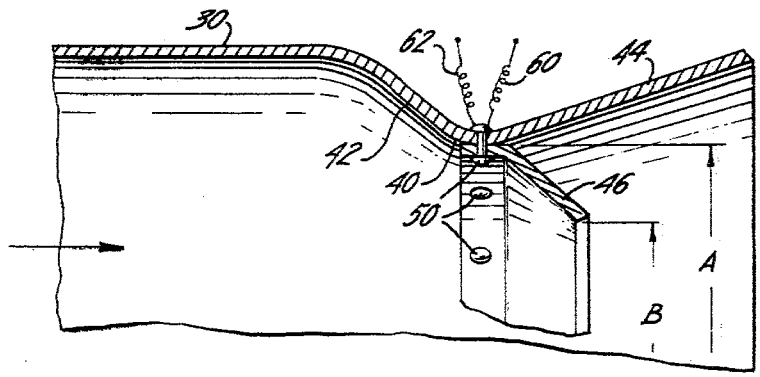
FIG. 2 is an enlarged view of a portion of FIG. 1.

As seen in the drawing, a turbojet engine 10 for an aircraft missile comprises an air inlet duct 12 having an air compressor 14 disposed therein. The compressor 14 delivers its compressed air to a combustion chamber 16 to which fuel is supplied by nozzles 18 from a fuel supply duct 19. The combustion chamber also includes a burner structure 20 for stabilizing the combustion flame. From the combustion chamber 16, the combustion gases are directed by vanes 22 for cooperation with the blades 24 of a turbine rotor 26. The rotor 26 is drivably connected by a shaft 28 to the compressor 14 for driving the compressor.

The combustion gases leaving the turbine rotor blades discharge through an exhaust duct 30 to provide the engine with forward thrust (leftward as viewed in FIG. 1). Such combustion gases contain considerable excess air. To augment the engine thrust provided by the combustion gases leaving the turbine 26, an afterburner combustion chamber 31 having a burner structure 32 is provided within the duct 30. Fuel is supplied to the afterburner structure 32 from fuel nozzles 34 to which fuel is supplied from a duct 36 under control of a valve 38. Thus, during non-afterburning mode of operation of the engine 10, fuel is only supplied for combustion in the main combustion chamber 16 whereas in its afterburner mode of operation additional fuel is supplied for combustion in the afterburner chamber 31. A suitable igniter (schematically indicated at 39) is provided for igniting the fuel supplied by the afterburner nozzles 34 to the afterburner structure 32. The igniter 39 could be, for example, a high energy spark-type igniter, a glow plug or a fuel nozzle utilizing a special hypergolic fuel. The igniter 39 would be automatically activated in timed relation to the opening of the afterburner fuel valve 38. Such a turbojet engine with an afterburner is conventional.

In accordance with the invention, the exhaust duct 30 has a nozzle throat portion 40 with an upstream convergent region 42 and a downstream divergent region 44 to provide the nozzle with a convergent-divergent profile when viewed in a plane including the axis of the duct 30. A jettisonable element 46 is secured within the duct at the throat of the nozzle 40. The element 46 has a truncated conical profile, as viewed in a plane including the axis of the duct 30 with its reduced diameter end being disposed downstream of the throat 40 so as that the conical element forms a generally streamline downstream continuation of the convergent nozzle portion 42.

With this construction when the conical element 40 is in position, the effective throat area of the exhaust nozzle is reduced from that shown by A at the throat of the nozzle 40 to that shown at B at the downstream end of the conical element 46.

The throat area B at the downstream end of the conical element 46 is sized so as to provide for proper operation of the turbojet engine 10 in its non-afterburning mode, that is, with the afterburner 31 inoperative. The larger throat area A, however, is required so as to provide efficient operation of the turbojet engine in its afterburning mode, that is, when fuel is supplied to the afterburner structure 32 for combustion in the afterburner combustion chamber 31. In accordance with the invention when the engine is to be operated in its afterburner mode, the conical element 46 is jettisoned whereupon the nozzle throat area is increased from B to A.

In order to support the conical element 46 so that it can be jettisoned, it is secured within the duct 30 by explosive fasteners such as rivets 50 and means are provided for exploding the rivets 50 when the afterburner is placed in operation. For example, as illustrated, the afterburner fuel valve is shown as being operated by a solenoid 52 connected to a source of electric energy 54 by a switch 56. In addition, the explosive rivets are connected by wires 60 and 62 across the same switch 56 and electric energy source 54. Accordingly, when the switch 56 is closed to open the fuel valve 38 to initiate the supply of fuel to the afterburner structure 32, the rivets are exploded thereby jettisoning the element 46. The element 46 jettisons rearwardly out through the duct 30 whereupon the nozzle throat automatically increases from the area B to the area A.

The structure described provides a relatively simple and lightweight two-position exhaust nozzle structure suitable, for example, for aircraft missiles powered by a turbojet engine in which thrust for the initial or cruise position of the missile flight is provided by operating the engine in its non-afterburning mode and the thrust for the final phase of the missile flight is provided by operating the engine in its afterburning mode. Furthermore, by locating the jettisonable nozzle element 46 at the throat 40, the size of said element for providing the smaller nozzle area B is minimized thereby further minimizing the overall weight and size of the exhaust nozzle. The divergent portion 44 of the nozzle 40 provides for more efficient use of the energy of the exhaust gases for providing engine thrust during the afterburner mode of operation of the engine 10.

As described, the nozzle element 46 is automatically jettisoned in response to initiation of fuel supply to the afterburner 32. Obviously, other means may be used to cause the element 46 to jettison, for example, upon activation of the igniter 39 for the afterburner 32 or by flame sensing means responsive to the initiation of a flame in the afterburner chamber 31. Instead of explosive rivets 50, it is also within the invention to utilize other means for releasably securing the nozzle element in position. For example, a releasable latch such as shown in U.S. Pat. No. 2,766,581 granted Oct. 16, 1956 to H. W. Welsh could be used in lieu of the explosive rivets 50.

It is apparent, therefore, that the invention clearly is not limited to the specific details herein described and that changes and modifications may occur to one skilled in the art without departure from the spirit or scope of the invention.

What is claimed is:

1. A turbojet engine for aircraft missiles including an afterburner, an exhaust nozzle duct disposed downstream of said afterburner for discharge of the engine exhaust therethrough and having a non-variable throat portion of convergent-divergent profile, an element secured to and within said nozzle duct at its said throat portion and coacting with said throat portion to provide a non-variable reduced cross-sectional flow area nozzle for non-afterburning operation of the engine, and means operative during flight to jettison said element when the engine afterburner is activated so that the effective cross-sectional flow area is defined by the throat portion.

2. A turbojet engine as claimed in claim 1 in which said element has a truncated conical cross-section as viewed in a plane including the axis of said duct with the diameter of said element decreasing in a downstream direction.

3. A turbojet engine as claimed in claim 2 in which said truncated conical element forms a downstream continuation of the convergent portion of said nozzle throat portion.

4. A turbojet engine as claimed in claim 3 in which said jettisoning means comprises explosive fastening means for securing said element to said duct.

5. A turbojet engine as claimed in claim 1 and including means for sensing initiation of afterburner operation for automatically rendering said jettisoning means operative when the afterburner is activated.

* * * * *